(12) United States Patent
Bogert

(10) Patent No.: US 8,087,923 B1
(45) Date of Patent: Jan. 3, 2012

(54) EXTREMELY THIN-WALLED EPTFE

(75) Inventor: David L. Bogert, Phoenix, AZ (US)

(73) Assignee: C. R. Bard, Inc., Murray Hill, NJ (US)

( * ) Notice: Subject to any disclaimer, the term of this patent is extended or adjusted under 35 U.S.C. 154(b) by 0 days.

(21) Appl. No.: 12/122,518

(22) Filed: May 16, 2008

Related U.S. Application Data

(60) Provisional application No. 60/930,914, filed on May 18, 2007, provisional application No. 60/936,622, filed on Jun. 21, 2007.

(51) Int. Cl.
*B29C 47/20* (2006.01)

(52) U.S. Cl. ........ 425/468; 425/461; 425/466; 425/467; 425/376.1; 264/323; 264/515; 264/150; 264/635

(58) Field of Classification Search ............ 264/323, 264/635, 515, 150; 425/392, 403, 380
See application file for complete search history.

(56) References Cited

U.S. PATENT DOCUMENTS

| | | |
|---|---|---|
| 3,260,774 A | 7/1966 | Harlow |
| 3,295,166 A | 1/1967 | Boyd |
| 3,953,566 A | 4/1976 | Gore |
| 4,120,630 A * | 10/1978 | LaSpisa et al. ............ 425/142 |
| 4,126,661 A | 11/1978 | Fulconis et al. |
| 4,145,385 A | 3/1979 | Sako et al. |
| 4,177,334 A | 12/1979 | Okita |
| 4,208,745 A | 6/1980 | Okita |
| 4,225,547 A | 9/1980 | Okita |
| 4,250,138 A | 2/1981 | Okita |
| 4,333,906 A | 6/1982 | Porter et al. |
| 4,380,520 A | 4/1983 | Taylor |
| 4,482,516 A | 11/1984 | Bowman et al. |
| 4,547,142 A | 10/1985 | Arenhovel et al. |
| 4,588,461 A | 5/1986 | Braun |
| 4,655,771 A | 4/1987 | Wallsten |
| 4,743,480 A | 5/1988 | Campbell et al. |
| 4,791,966 A | 12/1988 | Eilentropp |
| 4,806,086 A | 2/1989 | Bloch et al. |
| 4,828,770 A | 5/1989 | Fabian et al. |
| 4,850,999 A | 7/1989 | Planck |
| 4,861,256 A | 8/1989 | Covey |
| 4,876,051 A | 10/1989 | Campbell et al. |
| 4,911,846 A | 3/1990 | Akasu et al. |
| 4,925,710 A | 5/1990 | Buck et al. |
| 4,954,126 A | 9/1990 | Wallsten et al. |

(Continued)

FOREIGN PATENT DOCUMENTS

DE  3918736 A1  12/1990

(Continued)

OTHER PUBLICATIONS

PCT/US2002/027307 filed Aug. 28, 2002 International Preliminary Examination Report dated Oct. 31, 2003.

(Continued)

*Primary Examiner* — Yogendra Gupta
*Assistant Examiner* — Robert J Grun
(74) *Attorney, Agent, or Firm* — Rutan & Tucker, LLP

(57) ABSTRACT

An extrusion device is described herein, including an inventive die and mandrel that enable the production, using a conventional ram extruder, of strong coherent extremely thin-walled tubes having a wall thickness in the range of about 0.020 mm and about 0.080 mm.

16 Claims, 1 Drawing Sheet

U.S. PATENT DOCUMENTS

| | | |
|---|---|---|
| 4,971,836 A | 11/1990 | Fukasawa et al. |
| 4,999,146 A | 3/1991 | Grimes, Jr. et al. |
| 5,024,671 A | 6/1991 | Tu et al. |
| 5,026,513 A | 6/1991 | House et al. |
| 5,061,275 A | 10/1991 | Wallsten et al. |
| 5,064,435 A | 11/1991 | Porter |
| 5,071,407 A | 12/1991 | Termin et al. |
| 5,112,900 A | 5/1992 | Buddenhagen et al. |
| 5,123,917 A | 6/1992 | Lee |
| 5,147,385 A | 9/1992 | Beck et al. |
| 5,156,785 A | 10/1992 | Zdrahala |
| 5,197,976 A | 3/1993 | Herweck et al. |
| 5,221,261 A | 6/1993 | Termin et al. |
| 5,234,456 A | 8/1993 | Silvestrini |
| 5,282,823 A | 2/1994 | Schwartz et al. |
| 5,282,824 A | 2/1994 | Gianturco |
| 5,360,330 A * | 11/1994 | Jensen et al. ............... 425/144 |
| 5,378,239 A | 1/1995 | Termin et al. |
| 5,505,887 A | 4/1996 | Zdrahala et al. |
| 5,591,226 A | 1/1997 | Trerotola et al. |
| 5,607,468 A | 3/1997 | Rogers et al. |
| 5,607,478 A | 3/1997 | Lentz et al. |
| 5,609,624 A | 3/1997 | Kalis |
| 5,620,763 A | 4/1997 | House et al. |
| 5,628,782 A | 5/1997 | Myers et al. |
| 5,628,786 A | 5/1997 | Banas et al. |
| 5,628,788 A | 5/1997 | Pinchuk |
| 5,639,408 A | 6/1997 | King et al. |
| 5,641,443 A | 6/1997 | Calcote et al. |
| 5,645,559 A | 7/1997 | Hachtman et al. |
| 5,653,745 A | 8/1997 | Trescony et al. |
| 5,667,523 A | 9/1997 | Bynon et al. |
| 5,700,285 A | 12/1997 | Myers et al. |
| 5,718,973 A | 2/1998 | Lewis et al. |
| 5,735,892 A | 4/1998 | Myers et al. |
| 5,749,880 A | 5/1998 | Banas et al. |
| 5,788,626 A | 8/1998 | Thompson |
| 5,800,522 A | 9/1998 | Campbell et al. |
| 5,810,870 A | 9/1998 | Myers et al. |
| 5,843,166 A | 12/1998 | Lentz et al. |
| 5,874,032 A | 2/1999 | Zdrahala et al. |
| 5,955,016 A | 9/1999 | Goldfarb |
| 5,965,074 A | 10/1999 | Aubertin et al. |
| 5,993,489 A | 11/1999 | Lewis et al. |
| 6,000,927 A | 12/1999 | Prenzel et al. |
| 6,001,125 A | 12/1999 | Golds et al. |
| 6,027,779 A | 2/2000 | Campbell et al. |
| 6,048,484 A | 4/2000 | House et al. |
| 6,050,805 A | 4/2000 | Lupke |
| 6,187,054 B1 | 2/2001 | Colone et al. |
| 6,224,803 B1 | 5/2001 | Tiernan |
| 6,264,684 B1 | 7/2001 | Banas et al. |
| 6,436,135 B1 | 8/2002 | Goldfarb |
| 6,530,765 B1 | 3/2003 | Zdrahala et al. |
| 6,537,471 B2 | 3/2003 | Swanson et al. |
| 6,620,190 B1 | 9/2003 | Colone |
| 6,814,561 B2 * | 11/2004 | Venditti et al. ............ 425/326.1 |
| 7,425,291 B2 | 9/2008 | Venditti et al. |
| 7,597,775 B2 | 10/2009 | Sogard et al. |
| 2003/0082324 A1 | 5/2003 | Sogard et al. |
| 2007/0207186 A1 | 9/2007 | Scanlon et al. |

FOREIGN PATENT DOCUMENTS

| | | |
|---|---|---|
| EP | 0351584 A1 | 1/1990 |
| EP | 0551179 A1 | 7/1993 |
| EP | 0621015 A1 | 10/1994 |
| GB | 1505591 A | 3/1978 |
| WO | 8704935 A1 | 8/1987 |
| WO | 9505131 A1 | 2/1995 |
| WO | 9505132 A1 | 2/1995 |
| WO | 9505555 A1 | 2/1995 |
| WO | 9600103 A1 | 1/1996 |
| WO | 9628115 A1 | 9/1996 |
| WO | 9640001 A1 | 12/1996 |
| WO | 9702791 A1 | 1/1997 |
| WO | 9707751 A1 | 3/1997 |
| WO | 9838947 A1 | 9/1998 |
| WO | 011563 A1 | 1/2001 |
| WO | 0115633 A1 | 3/2001 |
| WO | 0241804 A1 | 5/2002 |

OTHER PUBLICATIONS

PCT/US2002/027307 filed Aug. 28, 2002 Search Report dated Dec. 5, 2002.

* cited by examiner

EXTREMELY THIN-WALLED EPTFE

PRIORITY

This application claims the benefit of priority to U.S. Provisional Patent Application No. 60/930,914, filed May 18, 2007, and U.S. Provisional Patent Application No. 60/936,622, filed Jun. 21, 2007, each of which is incorporated by reference into this application as if fully set forth herein.

BACKGROUND

Synthetic vascular grafts are routinely used to restore the blood flow in patients suffering from vascular diseases. For example, prosthetic grafts made from expanded polytetrafluoroethylene (ePTFE) are commonly used and have shown favorable patency rates, meaning that depending on a given time period, the graft maintains an open lumen for the flow of blood therethrough. Vascular grafts formed of ePTFE include a microstructure characterized by spaced apart nodes connected by fibrils, the distance between the nodes defined as internodal distance (IND), and are generally extruded either as a tube or as a sheet or film that is fashioned into a tube, but can also be created from fibers woven or knitted into a generally tubular shape.

Vascular grafts can be produced for use as a conduit, such as to bypass a damaged or diseased portion of a blood vessel, or for attachment to a stent or other intraluminal structure as a covering. A vascular graft covering may be positioned on one or more surfaces of an intraluminal structure to impart desired characteristics thereto. For example, a graft covering on an inner wall of a stent enables the smooth flow of blood through the stent graft when deployed in a blood vessel. Due to the relatively small dimensions of blood vessels and bodily cavities, a minimal profile of an intraluminal prosthesis, such as a stent graft, is important. As a result, it is desirable to provide a graft or covering with a uniformly thin wall.

The formation of a tubular ePTFE graft or covering using a ram extrusion process, followed by heating and longitudinal stretching, is well-known. For example, U.S. Pat. No. 6,620,190 to Colone describes extrusion processes for producing ePTFE tubular structures. According to conventional ram extrusion techniques, typical wall thicknesses for pre-stretched polytetrafluoroethylene (PTFE) tubes (i.e., "green tubes") range from approximately 0.250 mm to approximately 1 mm. However, U.S. Patent Application Publication No. 2003/0082324 to Sogard et al. describes an extrusion process that allegedly yields a PTFE tube extrudate of between about 0.100 mm to about 0.250 mm. This is accomplished, at least in part, by injecting air into the lumen of the extrudate as it exits the extruder die to prevent collapse, which is further described in U.S. Pat. No. 6,814,561 to Venditti et al. and is incorporated by reference in its entirety into this application. As mentioned, following extrusion, the PTFE green tube is stretched to produce a porous ePTFE structure. Stretching techniques, such as those described in U.S. Pat. No. 4,177,334 to Okita, can be used to thin the walls of extruded PTFE tubes. However, difficulties in the formulation of an extruded ePTFE tube with a uniformly thin wall are reported in U.S. Pat. No. 5,700,285 to Myers et al., which alternatively describes the use of wrapped ePTFE films to achieve a desired wall thickness of less than about 0.10 mm.

References describing extrusion of PTFE green tubes and/or the formulation of ePTFE products include: U.S. Pat. No. 3,295,166; U.S. Pat. No. 3,953,566; U.S. Pat. No. 4,145,385; U.S. Pat. No. 4,177,334; U.S. Pat. No. 4,208,745; U.S. Pat. No. 4,225,547; U.S. Pat. No. 4,250,138; U.S. Pat. No. 4,482,516; U.S. Pat. No. 4,743,480; U.S. Pat. No. 4,876,051; U.S. Pat. No. 4,925,710; U.S. Pat. No. 5,026,513; U.S. Pat. No. 5,505,887; U.S. Pat. No. 5,620,763; U.S. Pat. No. 5,700,285; U.S. Pat. No. 5,735,892; U.S. Pat. No. 5,810,870; U.S. Pat. No. 5,874,032; U.S. Pat. No. 6,048,484; U.S. Pat. No. 6,436,135; U.S. Pat. No. 6,530,765; U.S. Pat. No. 6,814,561; and U.S. Patent Application Publication No. 2003/0082324, each of which is incorporated by reference in its entirety into this application.

Applicants have recognized that it would be desirable to provide an apparatus for use with a conventional ram extruder, which extrudes a strong coherent tubular member with an extremely thin wall. Applicants have also recognized that it would be desirable to provide a method for producing strong coherent extremely thin-walled tubular members using conventional extrusion techniques.

BRIEF SUMMARY

Accordingly, strong coherent extremely thin-walled tubular members are formed using the apparatus and method described herein. In one embodiment, an inventive die and mandrel is used with a conventional ram extruder. The inventive die and mandrel enables the extrusion, via conventional extrusion techniques, of polymeric tubular members having a wall thickness of less than about 0.100 mm. For example, the wall thickness of a polymeric tubular member produced using an embodiment of the inventive die and mandrel described herein is in the range of about 0.020 mm to about 0.080 mm.

In one embodiment, an apparatus for extruding a tubular member includes a barrel having a bore extending from a proximal end to a distal end, a die having a channel in communication with the bore, the channel including a generally cylindrical first section in communication with a die opening, the first section having a length in the range of about 0.020 inch to about 0.250 inch, and a mandrel having a distal section positioned in the channel.

In another embodiment, an extrusion device includes a barrel having a bore extending from a proximal end to a distal end, a die having a channel in communication with the bore and a land length in the range of about 0.020 inch to about 0.100 inch, and a polyamide-imide mandrel.

In one embodiment, a method of extruding a PTFE green tube having a wall thickness in the range of about 0.020 mm and about 0.080 mm includes providing an extrusion device including a polyamide-imide mandrel and a die having a land length in the range of about 0.020 inch and about 0.100 inch, and moving a tubular PTFE billet through the extrusion device so that the PTFE green tube is extruded through an opening in the die.

These and other embodiments, features and advantages will become more apparent to those skilled in the art when taken with reference to the following more detailed description of the invention in conjunction with the accompanying drawings that are first briefly described.

DESCRIPTION OF THE PREFERRED EMBODIMENTS

The following description should be read with reference to the drawings, in which like elements in different drawings are identically numbered. The drawings, which are not necessarily to scale, depict selected embodiments and are not intended to limit the scope of the invention. The description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. Also, as used herein, the terms "patient", "host" and "subject" refer to any human or animal subject and are not intended to limit the systems or methods to human use, although use of the subject invention in a human patient represents a preferred embodiment.

Described herein is an apparatus and method for producing strong coherent tubular members with extremely thin walls that are suitable for use as a vascular graft. In one embodiment, the apparatus includes a conventional ram extruder with an inventive die and mandrel. The inventive die includes a very short land length (e.g., less than about 0.100 inch) and a mandrel made of a slightly compressible hard plastic, which Applicants have recognized enables repeated extrusion of extremely thin-walled tubes with substantially uniform wall thicknesses. In addition to enabling the repeated extrusion of advantageously thin-walled tubes, the inventive die and mandrel can be utilized with inexpensive extrusion equipment and can extrude tubes at low processing pressures. A preferred polymeric material for use with the apparatus and method described herein is a ram extruded fluoropolymer such as polytetrafluoroethylene (PTFE), although other polymers are possible.

Figure 1:
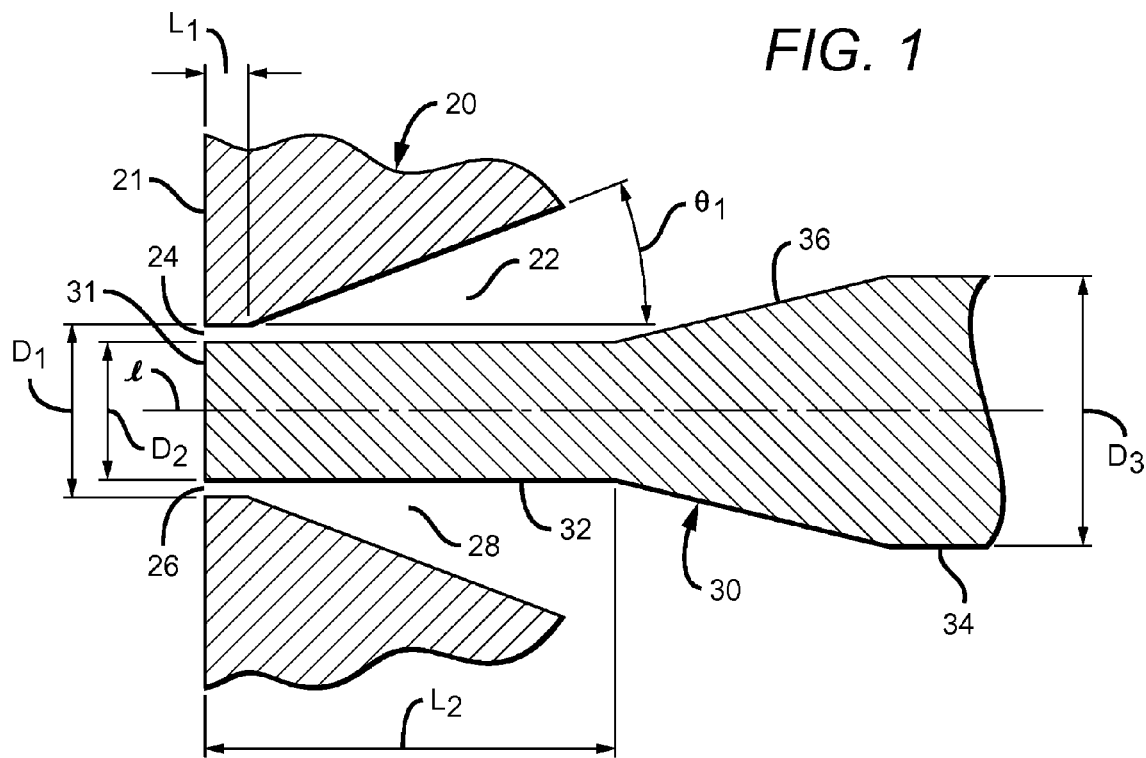
FIG. 1 is a an enlarged cross-sectional view of one embodiment of a die and mandrel.

Referring now to FIG. 1, an enlarged view of one embodiment of the inventive die is illustrated. A partial cross-sectional view of a die 20 is shown with a channel 22 that extends through the die 20 and terminates in an opening 24. The channel 22 includes a first section 26 in communication with the opening 24 and a second section 28 in communication with the first section 26. The opening is generally circular with a diameter $D_1$ in the range of about 0.200 inch to about 0.250 inch, preferably about 0.236 inch.

The first section 26 has a generally cylindrical shape and a length $L_1$, along a longitudinal axis 1 of the die 20, known in the art as the "land length" of the die. Conventional extrusion dies have a land length of at least 0.500 inch, which heretofore was believed necessary to align the polymer (e.g., PTFE) molecules in order to form a strong coherent tube. With land lengths of lower than 0.500 inch, for example as low as 0.250 inch, prior art results have reportedly been unfavorable with respect to producing a PTFE green tube with a wall thickness of less than about 0.130 mm. Different from prior art designs, the inventive die 20 includes a land length $L_1$ (i.e., the length of the first section 26) in the range of about 0.020 inch to about 0.250 inch. In a preferred embodiment, the length $L_1$ of the first section 26 is in the range of about 0.020 inch to about 0.100 inch, preferably about 0.030 inch. A die with a land length $L_1$ in the aforementioned ranges has been used by this inventor to produce strong coherent PTFE green tubes with wall thicknesses less than about 0.100 mm, as described more completely below.

The second section 28 has a generally frusto-conical shape with a surface that forms an angle $\Theta_1$ with the longitudinal axis 1 in the range of about 5 degrees to about 45 degrees. In a preferred embodiment the angle $\Theta_1$ is in the range of about 10 degrees to about 15 degrees, preferably about 12.5 degrees.

A mandrel 30 extends through the channel 22 and is centrally positioned therein, the distal section 32 of the mandrel extending through the first section 26 and terminating at the opening 24 of the die 20 (i.e., the distal face 31 of the mandrel 30 is approximately parallel to and coincident with the distal face 21 of the die 20). In other embodiments, the distal end of the mandrel 30 can be offset from the opening 24 by a short length in either direction (i.e., stopping proximal of the opening 24 or extending through the opening 24, for example, in the range of about 0.250 inches proximal of the opening 24 to about 0.250 inches distal of the opening 24). The mandrel 30 is generally cylindrical in shape and includes distal section 32 with a diameter $D_2$ less than a diameter $D_3$ of a proximal section 34. In a preferred embodiment, the diameter $D_2$ is in the range of about 0.200 inch to about 0.250 inch, preferably about 0.233 inch, while the diameter $D_3$ is in the range of about 0.225 inch to about 0.275 inch, preferably about 0.250 inch. A transition region 36 transitions the mandrel 30 from the proximal section 34 to the distal section 32, the transition region 36 forming an angle with respect to a longitudinal axis of the mandrel 30 in the range of about 1 degrees to about 45 degrees, preferably in the range of about 5 degrees to about 10 degrees, most preferably about 7 degrees. In a preferred embodiment, the distal section 32 has a length $L_2$ in the range of about 1 inch to about 5 inches, preferably about 3.5 inches.

The mandrel is preferably made from a length of hard but slightly flexible material which allows the pressure of the fluoropolymer to center the mandrel in the die in order to produce a uniform wall thickness for the polymeric tube (e.g. PTFE green tube). If the mandrel is too stiff (e.g., the flexural modulus is too high), it cannot "self center." Thus, in a preferred embodiment, the mandrel includes a length of material which has a flexural modulus at 73 degrees F. per ASTM test D790 of between about 0.50 Mpsi and about 1.50 Mpsi. A preferred material for the mandrel is a polyamide-imide material, such as Torlon® (Solvay Advanced Polymers LLC). Other potential mandrel materials include, for example, polyimide, phenolic, phenolic composites, PEEK, polyphenylene sulfide, polymeric composites, and Nitinol (titanium-nickel alloy).

It should be appreciated that other possible embodiments exist for the diameter $D_1$ of the die opening 24 and diameter $D_2$ of the mandrel distal section 32, but that in preferred embodiments, the diameters are directly related such that an increase/decrease in one results in the same or similar increase/decrease in the other. Specifically, the annular distance between the outer wall of the mandrel distal section 32 and the surface of the first section 26 in preferred embodiments is generally uniform and in the range of about 0.020 mm to about 0.100 mm, corresponding to the preferred wall thickness of the extruded PTFE green tubes.

Figure 2:
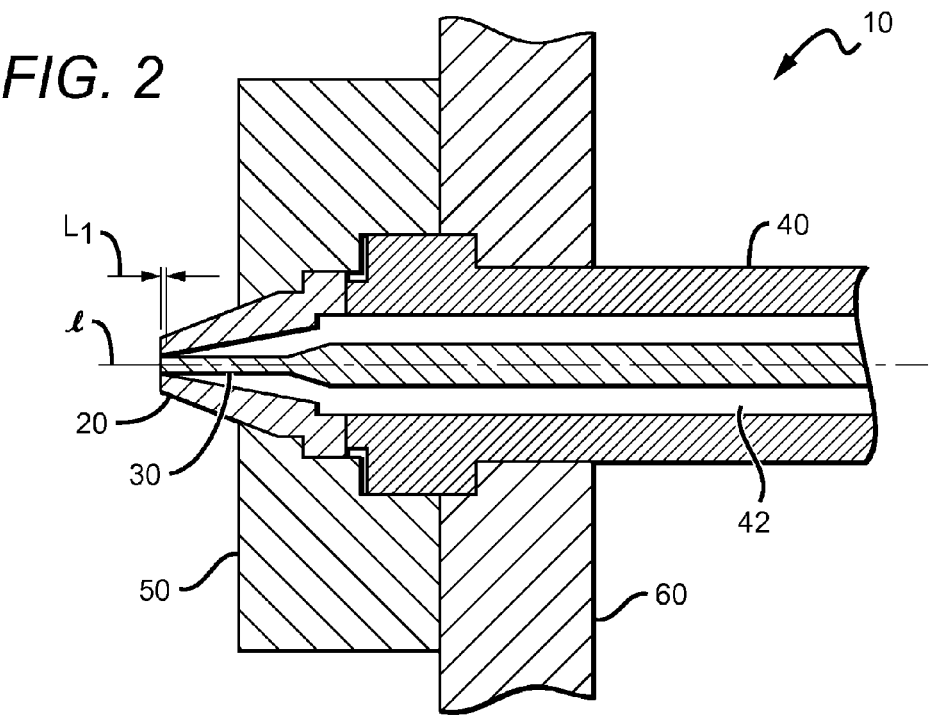
FIG. 2 is a cross-sectional view of the distal end of a ram extruder with the die and mandrel of FIG. 1.

Referring to FIG. 2, one embodiment of an extrusion device is shown including the inventive die and mandrel of FIG. 1. Extrusion device 10 can be part of a conventional ram extruder (not shown), which paste extrudes a polymeric material, such as PTFE, in the form of a resin mixed with a liquid lubricant. The PTFE paste (including PTFE resin and lubricant) is formed into a tubular billet that is loaded into the extruder and extruded through the extrusion device 10, as is known to one skilled in the art of extrusion. A partial cross-section of the extrusion device 10 is shown in FIG. 2, including die 20 and mandrel 30 as described above. Proximal section 34 of the mandrel 30 extends through a barrel 40 and is centrally positioned in the bore 42 of the barrel 40. The bore 42 is in communication with the channel 22 of the die 20. In a preferred embodiment, the barrel 40 has a diameter in the range of about 0.5 inch to about 1.0 inch, preferably about 0.875 inch. A collar 50 is positioned over the die 20 and barrel 40 and is attached to a face plate 60 to maintain the relative position of the die 20 and barrel 40 and to provide support thereto. In one embodiment, the die 20 is disposed with respect to barrel 40 and face plate 60 such that rotational movement of the die 20 is permitted. In such an embodiment, the die 20 is connected to a mechanism that rotates the die 20. The mandrel 30 may also be rotationally disposed with respect to the extrusion device 10 such that both die 20 and mandrel 30 can be simultaneously rotated, such as, for example, in opposite directions. Alternatively, only mandrel 30 may be rotationally disposed. In one embodiment, the extrusion device 10 is maintained at a uniform temperature during the extrusion process to prevent temperature variation in the PTFE paste between the billet stage and the green tube stage, as discussed more completely in U.S. Pat. No. 5,874,032, which is incorporated by reference in its entirety into this application.

The extrusion die and mandrel described herein has been used to extrude strong coherent extremely thin-walled PTFE tubes with a wall thickness of less than about 0.100 mm. In particular, the extrusion die and mandrel have produced extruded PTFE green tubes having a wall thickness in the range of about 0.020 mm to about 0.080 mm when used with a conventional ram extruder. During experimental testing with the extrusion die and mandrel described herein, PTFE green tubes having wall thicknesses in this range were repeatedly extruded over a wide range of lubricant levels, each exhibiting excellent physical properties for use as a graft or covering for an intraluminal prosthesis. Table 1, below, includes physical properties of ePTFE tubes initially formed using embodiments of the extrusion die and mandrel described herein. The PTFE green tubes were extruded with about 16% lubrication and dried following extrusion for about 15 minutes at about 120 degrees C. The dried PTFE tubes were then longitudinally expanded to about 500% of their extruded length at about 25% per second for about 20 seconds and at about 300 degrees C. to form ePTFE tubes. Following longitudinal expansion, the ePTFE tubes (with a density in the range of about 70% to about 90% air) were sintered at about 360 degrees C. The wall thicknesses of the tubes in Table 1 are those of the ePTFE tubes following longitudinal expansion. However, it is noted that longitudinal expansion had only a minimal effect on the wall thickness of the PTFE green tube, generally in the range of about 1 micron to about 5 microns, such that the thickness of the PTFE green tube immediately following extrusion was generally within the wall thickness range provided in Table 1 for each tube diameter.

In another embodiment, the extrusion die and mandrel described herein has been used to extrude strong coherent extremely thin-walled PTFE tubes with a wall thickness in the range of about 0.020 mm to about 0.090 mm when used with a conventional ram extruder. During experimental testing with the extrusion die and mandrel described herein, PTFE green tubes having wall thicknesses in this range were repeatedly extruded over a wide range of lubricant levels in the range of about 12% to about 20%, preferably about 14%. The extruded tubes were dried and expanded as discussed above to form ePTFE tubes that were then sintered. Referring again to FIG. 1, the extrusion die used for the tubes in this embodiment had a land length $L_1$ in the range of about 0.020 inch to about 0.150 inch, preferably about 0.125 inch, an opening diameter $D_1$ in the range of about 0.130 inch to about 0.410 inch, a mandrel diameter $D_2$ in the range of about 0.130 inch to about 0.410 inch, and a mandrel diameter $D_3$ in the range of about 0.225 inch to about 1.000 inch. Referring to FIG. 2, the barrel had a diameter in the range of about 0.5 inch to about 3.0 inch.

While the embodiments described herein pertain to an apparatus and method for producing strong coherent tubular members with extremely thin walls, it is noted that the extrusion die and mandrel described herein could also be used to extrude PTFE tubes with greater wall thicknesses and diameters. For instance, the extrusion die and mandrel described herein have been used to extrude PTFE tubes with a wall thickness up to about 0.8 mm and a diameter up to about 40 mm.

This invention has been described and specific examples have been portrayed. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. Finally, all publications and patent applications cited in this specification are herein incorporated by reference in their entirety as if each

TABLE 1

| Mandrel Diameter (mm) | Mandrel Diameter (inches) | Inside Diameter (mm) | Wall Thickness (microns) | IND (microns) | WEP (psi) | LTS (gm/mm$^2$) | RTS (psi) |
| --- | --- | --- | --- | --- | --- | --- | --- |
| 5.28 | 0.208 | 5.0 | 50-60 | 15 | 2.0-3.8 | 3385/541 | 377/143 |
| 6.25 | 0.246 | 5.9 | 60-70 | 20 | 1.5-4.0 | 4587/386 | 478/221 |
| 6.83 | 0.269 | 6.3 | 60-70 | 15 | 3.8-6.3 | 3886/223 | 592/123 |
| 7.24 | 0.285 | 6.7 | 70-80 | 33 | 1.5-2.3 | 2930/485 | 349/211 |
| 8.26 | 0.325 | 7.2 | 70-80 | 19 | 0.0-3.5 | 3032/424 | 597/746 |
| 9.27 | 0.364 | 8.1 | 80-90 | 17 | 2.8-6.3 | 3610/386 | 652/313 |
| 10.36 | 0.408 | 9.0 | 50-60 | 25 | 1.0-3.7 | 2669/360 | 184/100 |
| 11.53 | 0.454 | 10.2 | 60-70 | 15 | 0.0-4.0 | 2906/170 | 240/159 |

KEY:  IND = Internodal Distance (average)
WEP = Water Entry Pressure
LTS = Linear Tensile Strength (standard deviation)
RTS = Radial Tensile Strength (standard deviation)

What is claimed is:

1. An apparatus for extruding a tubular member, comprising:
   a barrel having a bore extending from a proximal end to a distal end;
   a die having a channel in communication with the bore, the channel including a generally cylindrical first section in communication with a die opening, the first section having a length in the range of about 0.010 inch to about 0.250 inch; and
   a solid mandrel comprising a polyamide-imide material and having a distal section positioned in the channel, the polyamide-imide material flexing under pressure from an extrudate forced through the die to center the mandrel in the die.

2. The apparatus according to claim 1, wherein the mandrel comprises a length of hard but slightly flexible material selected from a group consisting of polyamide-imide, polyimide, phenolic, phenolic composites, polyphenylene sulfide, polymeric composites, Nitinol, and combinations thereof.

3. The apparatus according to claim 1, wherein the length of the die first section is in the range of about 0.020 inch to about 0.150 inch.

4. The apparatus according to claim 3, wherein the length of the die first section is about 0.030 inch.

5. The apparatus according to claim 3, wherein the length of the die first section is about 0.125 inch.

6. The apparatus according to claim 1, wherein the die opening has a diameter in the range of about 0.100 inch to about 0.500 inch.

7. The apparatus according to claim 1, wherein the channel includes a second section having a frusto-conical shape in communication with the die first section.

8. The apparatus according to claim 1, wherein the mandrel distal section terminates at about the die opening.

9. The apparatus according to claim 1, wherein the mandrel includes a proximal section with a diameter greater than a diameter of a distal section.

10. An extrusion device, comprising:
    a barrel having a bore extending from a proximal end to a distal end;
    a die having a channel in communication with the bore and a land length in the range of about 0.020 inch and about 0.150 inch; and
    a solid polyamide-imide mandrel centering the mandrel in the die via flexion of the polyamide-imide under pressure from an extrudate forced through the die.

11. The apparatus according to claim 1, wherein a distance between an outer wall of the mandrel and a surface of the die first section is generally uniform and is in the range of about 0.020 mm and about 0.150 mm.

12. The apparatus according to claim 10, wherein the mandrel proximal section and distal section each have a generally cylindrical shape and are centrally positioned in the bore and the channel, respectively.

13. The extrusion device according to claim 10, wherein the mandrel includes a distal section that extends through the channel and terminates at a die opening.

14. The extrusion device according to claim 10, wherein the die land length is about 0.125 inch.

15. The extrusion device according to claim 8, wherein a mandrel distal face is approximately parallel to, and coincident with, a distal face of the die.

16. The extrusion device according to claim 13, wherein a mandrel distal face is approximately parallel to, and coincident with, a distal face of the die.

\* \* \* \* \*